United States Patent
Westendorf

[15] 3,668,674
[45] June 6, 1972

[54] METHOD AND ARRANGEMENT FOR TESTING OF VISIBILITY MEASURING ARRANGEMENTS

[72] Inventor: Werner Westendorf, Hamburg-Grossflottbek, Germany

[73] Assignee: Impulsphysik GmbH, Hamburg, Germany

[22] Filed: Jan. 30, 1970

[21] Appl. No.: 7,155

[30] Foreign Application Priority Data

Feb. 1, 1969 Germany.....................P 19 05 016.9

[52] U.S. Cl..............................340/214, 340/410, 340/411, 340/190, 356/103, 250/218
[51] Int. Cl. .....................................................G08b 29/00
[58] Field of Search...............340/214, 410, 411, 190, 237 S; 356/103, 104; 250/216, 217, 218

[56] References Cited

UNITED STATES PATENTS

| | | |
|---|---|---|
| 2,877,453 | 3/1959 | Mendenhall............................356/103 |
| 2,907,889 | 10/1959 | Delisle Nichols et al. .............340/190 |
| 3,234,536 | 2/1966 | Grant, Jr. et al.....................340/237 S |
| 2,763,853 | 9/1956 | Grant, Jr................................340/410 |

Primary Examiner—John W. Caldwell
Assistant Examiner—Robert J. Mooney
Attorney—Michael S. Striker

[57] ABSTRACT

A normal light input of a visibility meter is blocked and a light guide transmits light directly from the transmitter to the receiver. If the signal generated in the receiver as a function of the received test light is outside a given range, a failure alarm is generated. Proper operation of the visibility alarm relay, the supply voltage source, and the light flash generator are also furnished. The visibility measuring arrangement is tested automatically at predetermined time intervals.

17 Claims, 1 Drawing Figure

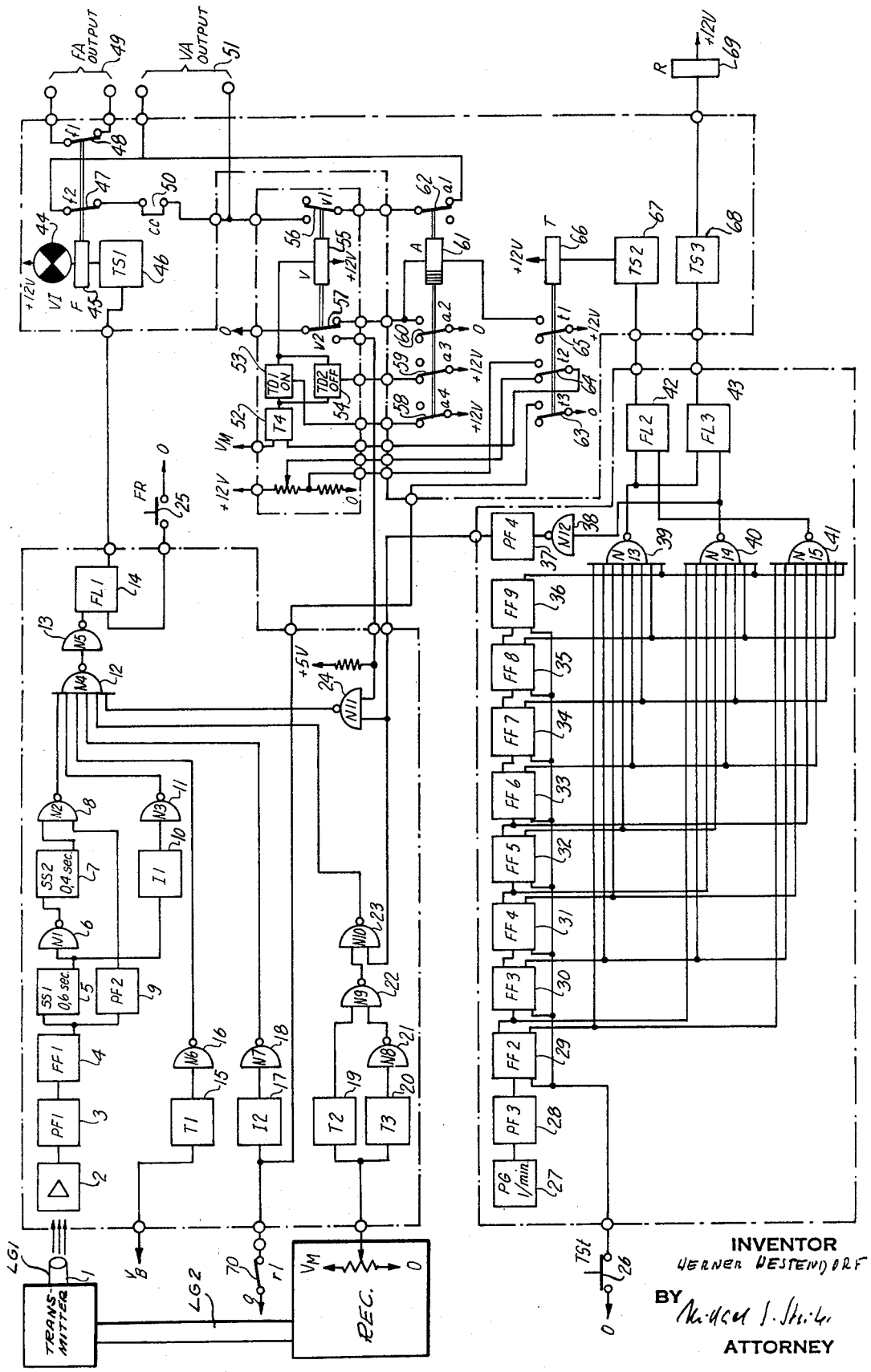

METHOD AND ARRANGEMENT FOR TESTING OF VISIBILITY MEASURING ARRANGEMENTS

BACKGROUND OF THE INVENTION

This invention relates to an arrangement and method for automatic testing of a visibility measuring arrangement comprising receiving means and transmitting means.

It is known that visibility measurement in the present state of the art comprises arrangements operating according to different principles:
1. measurement of the transmitted light; and
2. measuring of the scattered light.

For measurements according to the first-above set forth principle, a light transmitter and a light receiver are installed at the end points of a measuring range. The amount of light which the receiver receives for unlimited visibility corresponds to a transmission of 100 percent. When the visibility is less, the transmission decreases. For a transmission of from 2 to 5 percent (according to definition), the visibility corresponds to the length of the measuring range. From the mathematical relationship between transmission, base, and visibility range, a value of visibility range may be assigned to each value of transmission, since the base remains constant.

For measurements conducted according to the second principle set forth above, a light transmitter and a light receiver are also used. However, these are so installed that the axis of the transmitted beam and the receiving axis of the receiver intersect. Depending upon the magnitude of the angle of intersection, two types of arrangements may be built:
2a. measurement of the back-scattered light, acute angle of intersection of the axes; and
2b. measurement of the forward-scattered light, obtuse angle of intersection of the axes.

In measurement conducted according to the second principle, only the amount of light which is scattered by the atmosphere, almost specifically by particles in the atmosphere (aerosalts, dust particles, etc.) in different directions is received by the receiver. Thus the receiver receives little or no light when the visibility is high, but a great deal of light when the visibility is low. For each value of received light, a value of visibility range may be assigned.

Visibility measuring arrangements are generally equipped with alarm units which operate when a measured visibility range is less than a predetermined visibility range. Since these alarm signals are important for the protection of human life and often for the protection of goods (for example, in shipping, air transportation, traffic, etc.), the reliability of such visibility measuring arrangements must be the highest.

Equipment operating in accordance with the second principle, have one basic drawback relative to equipment operating in accordance with the first principle, namely, the received signal is smaller, the better the visibility. This means that, for example, for a defective transmitter or receiver, a condition of good visibility may appear to exist when actually the equipment is defective. Thus no visibility alarm would be generated when such visibility alarm should be generated.

SUMMARY OF THE INVENTION

It is an object of this invention to provide a failure-detection arrangement and method, so that the high reliability required of the visibility measuring arrangement may be achieved.

This invention thus comprises an automatic failure-detection arrangement in a visibility measuring arrangement, wherein transmitting means transmit light in a given direction and receiving means receive a portion of the transmitted light scattered at an angle to said given direction and generate a measuring signal as a function of the received light. The automatic failure-detection arrangement comprises means for blocking the scattered light from said receiving means. It comprises means for guiding the test quantity of light directly from said transmitting means to said receiving means, said receiving means being adapted to generate a test measuring signal in response to said test quantity of light.

Further, failure-signal generating means generate a failure-signal when said test measuring signal is less than a first predetermined measuring signal. The automatic failure-detection arrangement may further be operated automatically at predetermined time intervals.

If the visibility of the measuring arrangement also automatically generates an alarm if the visibility is less than the predetermined visibility range, then the method and arrangement in accordance with this invention may be broadened to include a test for the proper operation of the visibility alarm relay. This may be accomplished by disconnecting the alarm circuit to be activated by the visibility alarm relay and switching the alarm threshold of the visibility measuring arrangement to a value which would cause the visibility alarm relay to operate upon receipt of the test quantity of light. If the visibility alarm relay fails to respond to this quantity, a failure alarm may then be generated.

Thus, the following sources of maloperation are monitored;
1. improper operation of the receiver (complete lack of operation or incorrect operation);
2. improper operation of the visibility alarm unit;

In addition, the following may be monitored:
3. improper operation of the rotary magnet (e.g. mechanical shutter failure);
4. improper operating voltage $V_B$ (complete lack of operating voltage, or an operating voltage less than a predetermined minimum operating voltage;
5. improper operation of the transmitter (e.g. defective flash lamp); and
6. incorrect frequency of light flash (e.g. as a result of defective components in the transmitter).

The following more detailed explanations apply to the above set forth sources of error:

In connection with points 1 and 2 above: the receiver and the alarm unit comprise only electronic elements, that is, the elements are fully transistorized. They are operated at low voltage and far below the permissible operating load. The only electrical mechanical component is the alarm relay whose contacts operate the actual alarm circuit. Thus, failure of the components as a result of circuit design, is not to be expected, but such failure must, of course, be taken into consideration. The monitoring of the receiver takes place by monitoring a predetermined value of amplification. Thus, a predetermined amount of light supplied by the transmitter is applied to the receiver via a light guide, received by the photosensitive element (e.g. a photocell) and causes a voltage (test measuring signal $V_M$) to be generated at the output of the receiver which should have a predetermined value. This value is monitored by a voltage discriminator.

This monitoring, of course, cannot take place continually, since the actual operation of the visibility measuring arrangement must be discontinued therefor. The failure-detection arrangement is therefore operated periodically at time intervals which are set in such a manner that a favorable compromise between length of testing time, length of time for conducting actual visibility range measurements, and reliability is achieved.

Switching from "measuring" to "testing," is accomplished with the aid of a rotary magnet which activates a shutter which blocks the normal light input and simultaneously opens the receiver to the photoconductor, or light guide. The time intervals in which the magnet remains in the different positions are timed automatically. A predetermined minimum time period for "testing" process is required in order that the (amplifier-) measuring and indicating components can reach the levels of measuring signal $V_M$ required for the voltage discriminator.

Referring to point 2 above: Even if the visibility measuring arrangement functions correctly up to and including the indication of the visibility range (measuring signal $V_M$), the possibility may still exist that the alarm unit is defective. Therefore, simultaneously with the periodic testing of the receiver function and the measuring precision, the alarm unit is also tested. For this purpose, the alarm threshold is set to a value which is certain to be exceeded by the measuring signal $V_M$, so that the visibility alarm relay should be activated. Whether or not the visibility alarm relay has been activated, is determined by testing the position of an auxiliary contact. Since the alarm unit is equipped with a delay circuit causing a delay both in the switching in and the switching out of the visibility alarm, these delays must be disconnected during the testing period. Furthermore, this forced operation of the visibility alarm relay should not lead to an actual visibility alarm. Therefore the alarm circuit must be interrupted by means of another contact. However, if a visibility alarm was being generated before the beginning of the testing period, this visibility alarm should not be interrupted.

Concerning point 3 above: The rotary magnet must be considered a possible source of error insofar as purely mechanical defects (for example, a sticking of the shutter in the "testing" position) could lead to a constant blocking of the normal light input and a constant reception of light via the photoconductor. This would not be noticed in the testing procedure set forth under point 1. For this reason, the shutter operates a contact in its normal operating position (i.e. in the position during which the visibility measurement is being conducted). This position of this contact is monitored continually. However, during the periodic testing, the contact is opened because the rotary magnet assumes the other position. Therefore, during the testing time, the function of this contact is furnished by a contact in the failure-detection arrangement.

Concerning point 4 above: In addition to a complete lack of operating voltage, the equipment may be put out of proper operation if the operating voltage is less than a predetermined minimum operating voltage value or, alternatively incorrect measurements may result. Thus the operating voltage must also be monitored to make certain that it exceeds a predetermined minimum operating voltage. This is achieved by means of a voltage discriminator.

Concerning points 5 and 6 above: The equipment operates with a Xenon flash lamp as light source. The light flash is generated by the discharge of a capacitor charged to several kilovolts. Since the lamp and the components related to its operation are therefore under a very considerable electrical load, the possibility must be considered that the transmitter becomes defective either completely or in part. For example, the light flash frequency may change because of an increase of the internal impedance of the generator, or the light flashes may cease completely, for example because of a broken lamp or a short circuit in the capacitor. The testing is achieved by transmitting the light flashes generated in the transmitter via a photoconductor (for example a flexible glass fiber bundle) to a photosensitive element contained in the error-detection arrangement). The arrangement then determines whether:

1. any light flashes are present; and
2. whether the frequency of the flashes is sufficiently close to a predetermined frequency to allow exact functioning of the receiver.

Thus the following quantities are constantly monitored: The operating voltage $V_B$; the operation of the transmitter; the flash frequency of the transmitter; the correct position of the rotary magnet following a testing interval.

Monitored at regular intervals are: The measuring signal $V_M$ at the output of the receiver amplifier, which only achieves a predetermined value when both the flash amplitude and the receiver amplification are of the correct value; and the alarm unit of the visibility measurement arrangement, to assure proper switching of the visibility alarm relay.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a failure-detection arrangement in accordance with the present invention shown in block diagram form.

DESCRIPTION OF THE PREFERRED EMBODIMENT

The preferred embodiment of the present invention will now be discussed with reference to the drawing.
The following symbols are used in the FIGURE:

| | |
|---|---|
| A | =AUXILIARY RELAY |
| CC | =COUPLING CONNECTION (to make visibility alarm simultaneous with failure alarm) |
| F | =FAILURE ALARM RELAY |
| FA-OUTPUT | =FAILURE ALARM OUTPUT |
| FF | =RST FLIP-FLOP |
| FL | =RS FLIP-FLOP |
| FR | =FAIL-RESET |
| I | =INTEGRATOR |
| LG | =LIGHT GUIDE |
| N | =NAND GATE |
| PF | =PULSE FORMER |
| PG | =PULSE GENERATOR |
| R | =ROTARY MAGNET FOR LIGHT GUIDE SHUTTER |
| SS | =SINGLE SHOT |
| T | =THRESHOLD CIRCUIT |
| T | =TEST RELAY |
| TD | =TIME DELAY CIRCUIT |
| TSt | =TEST START |
| V | =VISIBILITY ALARM RELAY |
| VA-OUTPUT | =VISBILITY ALARM OUTPUT |
| $B_B$ | =BATTERY VOLTAGE (operating voltage) |
| VI | =VISUAL INDICATOR |
| $V_M$ | =MEASURING VOLTAGE (of the videograph) |

During operation of the equipment, the failure alarm relay coil, 45, is continually activated. This condition is indicated by means of indicator means 44. If the supply voltage is lacking, or if one of the monitored functions indicates an error, failure relay 45 is de-activated.

This coil constitutes part of the activating means for activating the failure signal generating means, The failure signal generating means in turn comprise the normally closed contacts of relay 45, namely contact 48. The contacts 48 are in turn connected to failure alarm output terminals 49. If it is desired that the visibility alarm is operated simultaneously with the failure alarm, the contacts 50 may be short-circuited by a wire CC, the contacts 50 being in series with the contacts 47, which are also normally closed contacts activated by relay coil 45. The relay 45 is controlled by a transistor switch TS 1, numbered 46, which in turn is controlled by an output Flip-Flop FL1, numbered 14. The Flip-Flop has a RESET condition which it assumes automatically when the equipment is first put into operation and which also may be achieved by activation of the key "failure alarm reset" numbered 25. The other condition of Flip-Flop 14, namely the condition from which coil 45 is de-activated and a failure alarm is generated, is the set condition which takes place when a NAND gate N4, numbered 12, generates a signal which is inverted by inverter N5, numbered 13. NAND gate 12 gives an output when a "zero" signal appears at any one of its six inputs. Such a "zero" signal is generated by improper operation of one of the six monitored functions. As long as all inputs of NAND gate 12 are positive ("1"), the first bistable circuit means, namely Flip-Flop 14 do not achieve the state in which a failure alarm is generated.

The test measuring signal, namely the signal at the output of the receiver upon receipt of the test quantity of light at the input of the receiver, is monitored by a voltage discriminator circuit. This comprises a threshold discriminator T2, numbered 19, a second threshold discriminator T3, numbered 20, an inverter stage 21 connected to the output of discriminator 20, and a gate N9, numbered 22, having a first input connected to the output of discriminator 19 and a second input connected to the output of discriminator 20. The threshold values of stages 19 and 20 differ by a predetermined amount. Only when the test measuring voltage $V_M$ has a value which lies between the two threshold values is a positive voltage generated at both inputs of gate 22, thus causing its output voltage to become "zero." It should be noted that the output voltage "zero" is not actually a zero voltage, but corresponds to the logical condition "zero."

If the voltage $V_M$ has a voltage exceeding the higher threshold value of stage 19 or a voltage less than the lower threshold value (stage 20), then the output potential of gate N9 (22), assumes the positive value "1." Again, a logical one is referred to here, not an actual voltage level.

In order that the output of the voltage discriminator circuit, comprising first comparing means, namely stage 20, second comparing means, namely stage 19, as well as inverter gate 21 and NAND gate 22, is applied to NAND gate 12 only during the periodic testing process, a gate N10, numbered 23, is connected between the output of the gate 22 and the input of gate 12 to which the output of gate 22 is to be applied. Gate 23 has a second input which receives a timing pulse, a "1" during the testing time. Only when both inputs of gate 23 are "1" does the output of gate 23 become "zero," thus causing NAND gate 12 to initiate a failure alarm.

The light flashes generated in the transmitting means reach a photosensitive element 2 via a photoconductor or light guide 1. The photosensitive element 2 converts the light pulses to electrical pulses. These are formed by a pulse-shaper 3 in such a manner that they are suitable for triggering the Flip-flop FF1, numbered 4 in the Figure. The output of FF1 is thus a symmetrical square wave of half the light flash frequency. The 1/0 edge of the square wave triggers the monostable multivibrator SS1, numbered 5, which automatically resets after 0.6 seconds. The positive 0/1 trailing edge of the negative 0.6 second pulse, triggers a monostable multivibrator SS2, numbered 7, via inverter N1, numbered 6. The second monostable multivibrator 7 resets automatically after 0.4 seconds. Thus, starting with the 1/0 edge of the square wave, a negative pulse appears at the output of monostable multivibrator 7 from a time of 0.6 seconds until a time of 1 second. This output pulse is applied to one input of gate N2, numbered 8. A short positive pulse, derived through differentiation of the 0/1 edge of the square wave and formed in the pulse former PF2, numbered 9 in the Figure, is applied to the second input of gate 8. Thus when the 1/0 edge and the 0/1 edge of the square wave are separated in time between 0.6 and 1 second, then the positive pulse arrives at the second input of gate 8 at a time when a negative pulse derived from stage 7 exists as the first input of gate 8. Thus the output of gate 8 remains in a "1" condition.

However, if the distance in time between the 1/0 edge and the 0/1 edge of the square wave is less than 0.6 seconds or greater than 1 second, then the positive pulse arrives at second input of gate 8 at a time at which the first input of gate 8 is also positive. Thus a negative pulse is created at the output of gate 8, which initiates a failure alarm via NAND gate 12. Thus, for the particular monostable multivibrators used here, having, respectively, time intervals of 0.6 seconds and 0.4 seconds, an alarm is generated whenever the frequency of the light flash is less than 60 flashes per minute—or greater than 100 flashes per minute.

Thus, monostable multivibrators 5 and 7 in conjunction with the gates 6 and 8 and pulse former 9, constitute timing circuit means which cause the generation of a failure alarm signal when the intervals between light flashes exceeds a first predetermined light flash interval—or is less than a second predetermined light flash interval. With the above-described timing circuit means, it is possible, with relatively little equipment, to monitor a relatively slow pulse frequency very exactly within widely separated but nonetheless exact limits. The only difficulty with this timing circuit is that, if the light flashes cease completely, after having maintained the correct frequency previously, the case can arise that no alarm signal is generated.

For this reason, a simple integrator circuit was added to the timing circuit means. It is the function of this circuit to determine only roughly, whether any light flash sequence having, for example, a frequency of more than 30 flashes per minute is present. This is achieved by integrator I1, labeled 10 in the Figure. This comprises a capacitor which is charged positively via a resistance. If this charging process continues undisturbed, a predetermined threshold value is exceeded and a negative signal is furnished via inverter N3, numbered 11, to an input of gate 12, thus causing a failure alarm to be generated. In order to prevent this generation of a failure alarm, the capacitor is periodically discharged by the negative 0.6 second pulses furnished by monostable multivibrator 5, via a diode. As long as these pulses arrive in not excessively long-time periods, the charge on the capacitor contained in stage 10 cannot exceed the above-mentioned threshold value and no alarm is generated.

The integrator stage 10, and following inverter 11, thus constitute additional timing circuit means.

The operating voltage $V_B$ is furnished by a voltage source. The voltage source is monitored by a voltage source discriminator comprising discriminator T1, numbered 15, and an inverter N6, numbered 16. If the supply voltage, or operating voltage, is less than a predetermined minimum supply voltage, a "zero" signal is furnished from the output of inverter 16 to an input of gate 12, thus causing generation of a failure alarm.

In the Figure, the rotary magnet R, is numbered 69. This rotary magnet operates the light shutter. Its position is indicated by the state of contacts r1, numbered 70. As indicated on the left-hand side of the Figure, when the contacts 70 are closed, the input of integrator I2, numbered 17, are connected to zero potential. Thus the integrator capacitor cannot charge. Integrator 17 and inverter 18, connected to the output of integrator 17, operate similarly as do integrator 10 and inverter 11, connected to the output of integrator 10. The operation of the latter was previously described. During the testing operation, rotary magnet 69 is operated, causing contact 70 to open. In order to prevent a failure alarm to be generated by this opening, the function of contacts 70 are taken over during this time by a pair of shunting contacts 63 associated with relay 66.

The state of the visibility alarm relay numbered 55 in the Figure, within the visibility alarm unit, is tested by testing the contacts v2 (57), the position of the movable arm 57 varying the voltage at one input of gate N11, numbered 24 in the Figure. The same positive timing pulse applied to gate N10 (23) for periodic checking of test measuring signal $V_m$ is also applied to gate N11 (24). If the visibility alarm relay, 55, has been properly activated, then a zero potential is applied to one input of gate N11 (24) via contact v2 (57), when the positive timing pulse is applied to the other input. Thus the output of N11 (24) remains positive and no failure alarm is initiated. However, if relay 55 has not been activated, a failure alarm is initiated.

The timing of the whole failure detection process is carried out by means of a pulse generator PG27. This pulse generator generates pulses at 1 minute intervals. These pulses trigger an eight-stage binary counter after pulse forming in stage 28. The counter contains Flip-Flops FF2 through FF9, numbered 29–36 in the Figure. Starting with the zero condition, the counter returns to its original position after $2^8$ input pulses. In the zero condition of the counter, a failure detection process in initiated. Thus failure detection takes place every 256 minutes. Of course, shorter or longer intervals between the testing of failure detection processes may be achieved by varying the number of counting stages.

The zero condition of the counter is automatically achieved when the equipment is first energized, and may also be manually set by depression of the start key, numbered 26 in the Figure.

The output of the counting stages 29 through 36 are connected to the eight inputs of three gates, numbered 39 through 41. The output of gate 39 changes from a "1" to "0" condition when the counter is set to zero, the output of gate 40 switches from "1" to "0" after 5 minutes, while the output of gate 41 makes the same change after 8 minutes.

These three 1/0 edges trigger two bistable Flip-Flops, FL2 (42) and FL3 (43). FL3 is set at time zero by gate 39 and reset after 5 minutes by gate 40. During these first 5 minutes, it operates the rotary magnet R (69) for the light guide shutter via transistor switch TS3 (68). Flip-Flop FL2 (42) is also set at time zero by gate 39, but is reset after 8 minutes by gate 41. Test relay T(66) is operated during this time via transistor switch TS2 (67). This causes the following circuit actions to occur during the testing, or error detection, period:

a. The function of the contact r1, numbered 70 in the Figure, which serves to indicate the position of the rotary magnet, is taken over as described above by contact numbered 63 in the Figure.

b. The alarm threshold in the alarm unit is changed. A predetermined adjustable voltage is furnished via contact t2 (64) to a discriminator T4, numbered 52 in the Figure to constitute its threshold value. If the test measuring signal, $V_M$, exceeds this threshold value, the visibility alarm relay, 55, is activated. Since the correct functioning of these components is to be tested, the threshold value of the discriminator is switched via a normally opened contact connectable by arm 64 to a value which is so low that it must be exceeded by the test measuring signal $V_M$ is this assumes the correct value during the testing period.

c. The alarm delay in the alarm unit is disconnected. The visibility alarm relay 55 is activated via an activation delay TD1, numbered 53, and is deactivated via a deactivation delay TD2, numbered 54 in the Figure. This is done so that relay 55 is not constantly switched in and switched out when the visibility range, and therefore the test measuring signal $V_M$ is approximately equal to the threshold value of T4 (52). However, during the testing process, these delays must be disconnected, since otherwise they would unnecessarily lengthen the testing process. The disconnection of delay 53 takes place via contact a4 (58), while the disconnection of TD2 (54) takes place via contact a3 (59). These contacts are activated when current passes through the auxiliary relay 61. The current can pass through auxiliary relay 61 only when visibility alarm relay 55 is deactivated, and thus contact 57 is in the normally closed position, completing the circuit through relay coil 61. In other words, if a visibility alarm is in operation at the beginning of the testing period, that is when relay 66 is first activated, then relay 61 cannot be activated and the delay circuits 53 and 54 are not disconnected. However, once relay 61 has been activated, the activation is maintained over its own contact, 60, until the movable arm 65 disconnects contact t1 at the end of the test period.

d. Prevention of the generation of the visibility alarm through the error detection process. If no visibility alarm is being generated at the beginning of the testing process, then auxiliary relay 61 is activated. Therefore, contact a1 (62) breaks the connection between the visibility alarm contact v1 (56) and the visibility alarm output VA-OUTPUT (51).

e. Maintenance of any visibility alarm existing at the beginning of the test period. As mentioned under (c) above, auxiliary relay 61 cannot be activated if a visibility alarm exists at the beginning of the test period. Therefore, movable arm 62 cannot interrupt such a visibility alarm.

5 minutes after the beginning of the test period, a 1/0 edge is delivered at the output of gate 40. This is inverted in inverter 38 and differentiated in pulse former PF4 (37), so that the positive timing pulse required for gates 23 and 24 is generated.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. In a visibility measuring arrangement including transmitting means, transmitting light flashes in a given direction at predetermined intervals, receiving means receiving back-scattered transmitted light flashes and generating a measuring signal as a function of so-received light, an automatic failure detection arrangement comprising, in combination, timing circuit means having a timing circuit input and a timing circuit output; transducing means receiving light flashes from said transmitting means, transforming said light flashes into corresponding electrical signals, and furnishing said electrical signals to said timing circuit input, said timing circuit means furnishing a timing circuit output signal at said timing circuit output when the interval between said electrical signals at said timing circuit input exceeds a first predetermined interval; blocking means for blocking said back-scattered transmitted light from said receiving means during failure detection; means guiding a test quantity of light flashes directly from said transmitting means to said receiving means while said blocking means is blocking said back-scattered transmitted light flashes from said receiving means, said receiving means generating a test-measuring signal in response to said test quantity of light flashes; and failure signal generating means for generating a failure signal in response to said timing circuit output signal or when said test-measuring signal is less than a first predetermined measuring signal.

2. An arrangement as set forth in claim 1 further comprising additional timing circuit means connected with said timing circuit means and having an additional timing circuit output for furnishing an additional timing circuit output signal in the absence of said electrical signals; and wherein said failure signal generating means further generate said failure signal in response to said additional timing circuit output signal.

3. An arrangement as set forth in claim 1 wherein said timing circuit is further adapted to generate said timing circuit output signal when said electrical signals occur at intervals less than a second predetermined interval.

4. An arrangement as set forth in claim 1, wherein said failure signal generating means further generate a failure signal when said test measuring signal is greater than a second predetermined measuring signal.

5. An arrangement as set forth in claim 4, further comprising first comparing means for comparing said test measuring signal to said first predetermined measuring signal, and generating a first comparison signal when said test measuring signal is less than said first predetermined measuring signal; second comparing means for comparing said test measuring signal to said second predetermined measuring signal and generating a second comparison signal when said test measuring signal is greater than said second predetermined measuring signal; and activating means connected to said first and second comparing means, for activating said failure signal generating means in the presence of said first or second comparison signals.

6. An arrangement as set forth in claim 1, wherein said visibility measuring arrangement further comprises visibility alarm relay means having visibility alarm relay contacts, a visibility alarm circuit connected to said visibility alarm relay contacts and adapted to generate said visibility alarm upon activation of said visibility alarm relay means; visibility alarm activating means for activating said visibility alarm relay in response to measuring signals indicating a visibility range less than a predetermined visibility range; wherein said automatic failure detection arrangement further comprises means for preventing the activation of the visibility alarm circuit during the operation of said automatic failure detection arrangement; means for adjusting said visibility alarm relay activating means so as to cause activation of said visibility alarm relay in response to said test measuring signal; and means for generating said failure signal upon failure of said visibility alarm relay contacts to operate.

7. An arrangement as set forth in claim 5, wherein said means for transmitting a test quantity of light directly from said transmitting means to said receiving means comprise a light guide interconnecting said transmitting means and said receiving means.

8. An arrangement as set forth in claim 7, further comprising means for operating said automatic failure detection apparatus automatically at predetermined intervals.

9. An arrangement as set forth in claim 8, wherein said means for operating said failure detection arrangement automatically at predetermined intervals comprise pulse generator means; and a plurality of counting stages having an input connected to said pulse generator means, and an output connected to said automatic failure detection arrangement in such a manner that said arrangement is activated after a predetermined number of pulses from said pulse generator means.

10. An arrangement as set forth in claim 5, wherein said failure signal generating means comprise a pair of normally closed failure alarm relay contacts of a failure alarm relay and wherein said activating means for activating said failure signal generating means comprise the coil of said failure alarm relay.

11. An arrangement as set forth in claim 10, wherein said activating means further comprise first bistable circuit means connected to said failure alarm relay coil for controlling the current therethrough.

12. An arrangement as set forth in claim 11, further comprising a first NAND having a first NAND gate output connected to said first bistable circuit means, and a plurality of first NAND gate inputs.

13. An arrangement as set forth in claim 12, wherein said means for blocking said scattered light from said receiving means comprise rotary magnet means, said rotary magnet means having a pair of contacts opened during failure detection; said automatic failure detection arrangement further comprising a pair of shunting contacts for shunting said rotary magnet contacts during automatic failure detection.

14. An arrangement as set forth in claim 13, further comprising detector means having a detector output connected to one of said NAND gate inputs, and adapted to furnish a signal to said one of said NAND gate inputs when said shunting contacts and said rotary relay contacts are opened simultaneously.

15. An arrangement as set forth in claim 14, further comprising a supply voltage source; voltage source discriminator means having a discriminator output connected to a further one of said NAND gate inputs, and a discriminator input connected to said supply voltage source, said voltage source discriminator means being adapted to furnish a signal to said further NAND gate input when the supply voltage is less than a predetermined minimum supply voltage.

16. An arrangement as set forth in claim 11, further comprising indicator means for indicating the state of activation of said failure alarm relay.

17. An arrangement as set forth in claim 12, wherein said timing circuit output is connected to a selected one of said first NAND gate inputs.

* * * * *